United States Patent
Freed et al.

(10) Patent No.: US 9,368,105 B1
(45) Date of Patent: Jun. 14, 2016

(54) PREVENTING FALSE WAKE WORD DETECTIONS WITH A VOICE-CONTROLLED DEVICE

(71) Applicant: Rawles LLC, Wilmington, DE (US)

(72) Inventors: Ian W. Freed, Seattle, WA (US); William Folwell Barton, Harvard, MA (US); Rohit Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/316,612

(22) Filed: Jun. 26, 2014

(51) Int. Cl.
*G10L 15/187* (2013.01)
*G10L 15/00* (2013.01)

(52) U.S. Cl.
CPC ..................... *G10L 15/00* (2013.01)

(58) Field of Classification Search
CPC ........................................... G10L 15/00
USPC ............................. 704/4, 208–254
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,165,886 B1 * | 4/2012 | Gagnon | G10L 15/26 704/275 |
| 8,971,217 B2 * | 3/2015 | Smith, Jr. | H04L 47/10 370/260 |
| 9,098,467 B1 * | 8/2015 | Blanksteen | G10L 15/22 |
| 2003/0115067 A1 * | 6/2003 | Ibaraki | H04N 5/44513 704/275 |
| 2004/0128137 A1 * | 7/2004 | Bush | G10L 15/26 704/275 |
| 2012/0223885 A1 | 9/2012 | Perez | |
| 2014/0249817 A1 * | 9/2014 | Hart et al. | 704/239 |

FOREIGN PATENT DOCUMENTS

WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Marcellus Augustin
(74) *Attorney, Agent, or Firm* — Lee & Hayes, PLLC

(57) ABSTRACT

Natural language controlled devices may be configured to activate command recognition in response to one or more wake words. Techniques are provided to allow for multiple operating modes in which different recognition parameters are employed in recognizing wake words that activate the natural language control functionality of a computing device.

16 Claims, 7 Drawing Sheets

PREVENTING FALSE WAKE WORD DETECTIONS WITH A VOICE-CONTROLLED DEVICE

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech.

The use of natural language input to interact with computing devices presents many challenges. One challenge concerns ensuring that the natural language speech is intended to be a command to be executed by the computing device. In general, the user may indicate that natural language input is intended to be a command by clicking on a window, pressing an icon on a touch screen, or otherwise explicitly indicating that the natural language input is a command using a non-natural language input. However, in systems in which a user gives natural language commands to a computing device without first indicating the natural language input includes commands, the computing device may be unable to act on the commands. In other cases, the computing device may incorrectly interpret background noises or background speech that is not intended to be natural language input as a natural language command.

Accordingly, there is a need for techniques to improve the user experience in interacting with natural language control devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
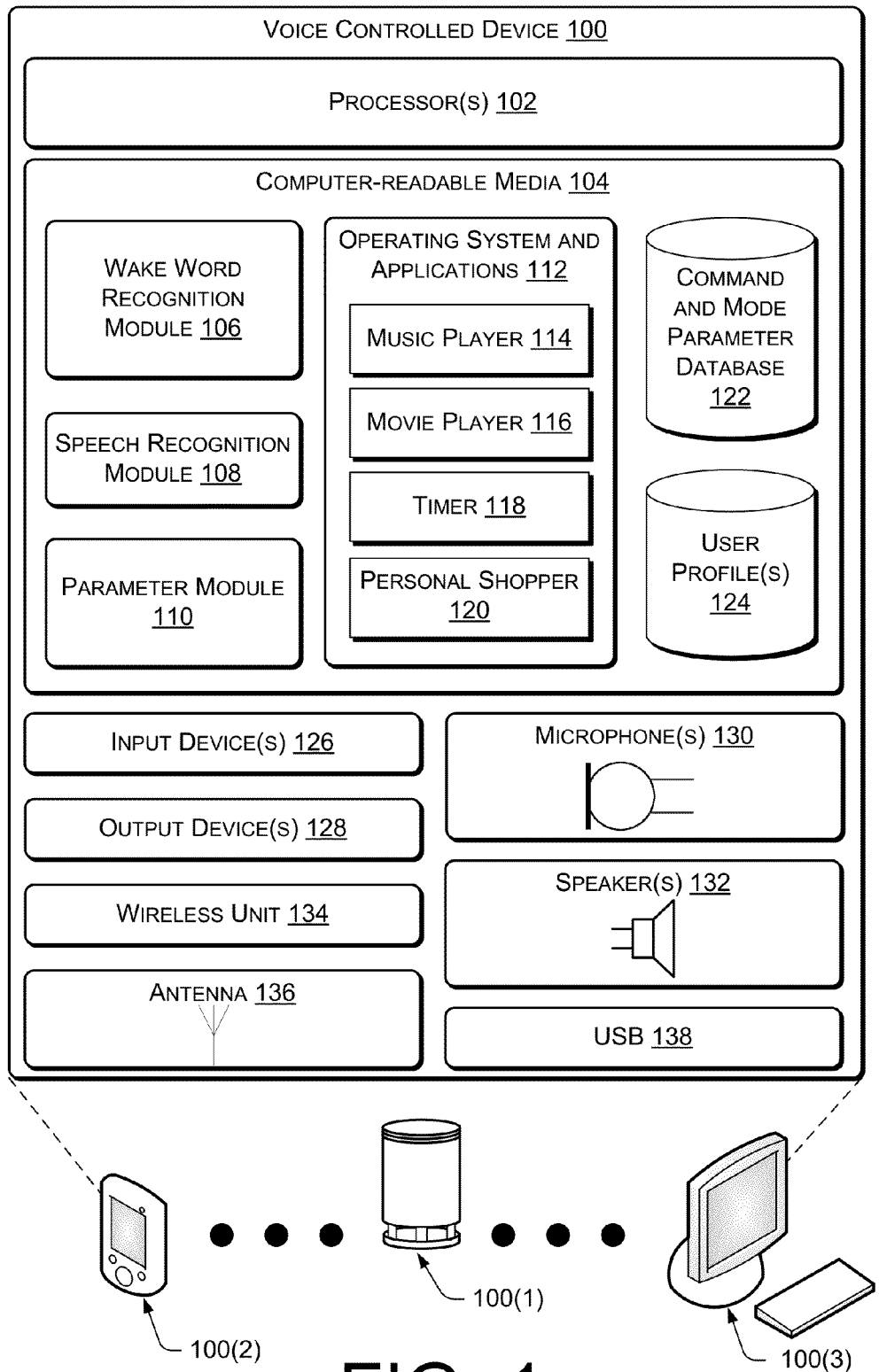
FIG. 1 shows a functional block diagram of selected components implemented at a voice controlled device.

Some computing devices require users to explicitly indicate that a natural language command is about to be input to the device using a non-natural language input. For instance, a user may be asked to press a button or touch a soft key on a graphical user interface to inform the device that he or she intends to speak a command. However, as human-machine interfaces evolve, users may wish to provide natural language commands to the device itself without resorting to supplemental non-natural language input.

Natural language commands may indicate an act or command to be executed. For example, a user may ask "What time is it?" Without a non-natural language input, it is confusing for the computing device to know whether the user is talking to the device, or to another person in the room. Accordingly, the device may act on this command. If the user was merely asking another person, the device's execution of the command to provide an answer may interrupt the user's conversation in an unintended fashion. That is, devices that do not include a non-natural language input to activate the natural language recognition functionality may recognize the person to person question as a command to the computing device. As a result, a device may act in a manner unexpected by the user even though the device correctly recognized the command. This may become tedious and can distract from the user experience.

To reduce the number of accidental command recognitions, a natural language input, hereinafter termed a "wake word," may be utilized as a trigger to enable a natural language command recognition functionality of a natural language controlled device. For example, a command recognition may occur when the command is preceded or followed by a wake word. However, similar problems to those discussed above may arise if the device activates based on a false positive recognition of the wake word. For example, a false positive recognition of a wake word of a natural language controlled device during a teleconference could result in the device outputting speech or other sounds at a disruptive or otherwise inopportune moment in the teleconference.

This disclosure provides techniques and systems for utilizing a plurality of operating modes to reduce false positive recognitions of wake words. For example, some implementations may include a "normal mode" in which a natural language controlled device responds to commands associated with wake words as well as a "slumber mode" in which the natural language controlled device responds to a limited set of commands. More particularly, some implementations may include a slumber mode in which the commands the device may respond to are limited to a command to exit the slumber mode. In addition, the recognition settings may be different for different modes of the plurality of operating modes. For example, the recognition settings for the slumber mode may include a level of certainty for recognizing the exit slumber mode command which is higher than a level of certainty for recognizing other commands in the normal mode. Thus, some implementations according to this disclosure may provide for operating modes that, among other things, may involve various recognition certainty levels that may adapt the chance of false positive recognitions depending on the current operating mode.

Voice interactions are one type of natural language command. Thus, a user may talk to a computing device and expect the device to appropriately act on his or her spoken commands. Natural language commands are not limited to speech and may also be provided as typed commands, handwritten commands, etc. As such, while example implementations described herein refer to voice controlled devices, the implementations are not limited thereto and may include natural language input controlled devices in general.

Moreover, though discussed in terms of operating modes such as the above described slumber mode, the techniques described herein may be applied to other types of operating modes and/or other functionality. For example, the different recognition settings (e.g. levels of recognition certainty) may be applied for switching between various operating and/or for locking, restricting, disabling, unlocking, unrestricting, and/or enabling functionality of a computing device by natural language commands, including non-speech and non-audio natural language commands.

FIG. 1 shows selected functional components of a natural language input controlled device, specifically, voice controlled device 100. The voice controlled device 100 may be implemented as a standalone device 100(1) that is relatively simple in terms of functional capabilities with limited input/output components, memory, and processing capabilities. For instance, the voice controlled device 100(1) does not have a keyboard, keypad, or other form of mechanical input. Nor does it have a display or touch screen to facilitate visual presentation and user touch input. Instead, the device 100(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 100(1) is through voice input and audible output.

The voice controlled device 100 may also be implemented as a mobile device 100(2) such as a smart phone or personal digital assistant. The mobile device 100(2) may include a touch-sensitive display screen and various buttons for providing input as well as additional functionality such as the ability to send and receive telephone calls. Alternative implementations of the voice control device 100 may also include configuration as a personal computer 100(3). The personal computer 100(3) may include a keyboard, a mouse, a display screen, and any other hardware or functionality that is typically found on a desktop, notebook, netbook, or other personal computing devices. The devices 100(1), 100(2), and 100(3) are merely examples and not intended to be limiting, as the techniques described in this disclosure may be used in essentially any device that has an ability to recognize speech input.

In the illustrated implementation, the voice controlled device 100 includes one or more processors 102 and computer-readable media 104. The computer-readable media 104 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 104 may be implemented as computer-readable storage media ("CRSM"), which may be any available physical media accessible by the processor(s) 102 to execute instructions stored on the memory 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 102.

Several modules such as instruction, datastores, and so forth may be stored within the computer-readable media 104 and configured to execute on the processor(s) 102. A few example functional modules are shown as applications stored in the computer-readable media 104 and executed on the processor(s) 102, although the same functionality may alternatively be implemented in hardware (such as by an application specific integrated circuit (ASIC)), firmware, or as a system on a chip (SOC).

A wake word recognition module 106 and a speech recognition module 108 may employ any number of conventional speech recognition techniques such as use of natural language processing and extensive lexicons to interpret voice input. For example, the speech recognition module 108 may employ general speech recognition techniques and the wake word recognition module may include speech or phrase recognition particular to the wake word. In some implementations, the wake word recognition module 106 may employ a hidden Markov model that represents the wake word itself. This model may be created in advance or on the fly depending on the particular implementation. In some implementations, the speech recognition module 108 may initially be in a passive state in which the speech recognition module 108 does not recognize or respond to speech. While the speech recognition module 108 is passive, the wake word recognition module 106 may recognize or respond to wake words. The wake words that the wake word recognition module 106 may recognize and respond to may have corresponding recognition settings that may depend at least in part on a current operating mode of the voice control device 100. The recognition parameters may be determined by the parameter module 110.

Once the wake word recognition module 106 recognizes or responds to a wake word, the speech recognition module 108 may enter an active state in which the speech recognition module 108 operates to detect any of the natural language commands for which it is programmed or to which it is capable of responding. While in the particular implementation shown in FIG. 1, the wake word recognition module 106 and the speech recognition module 108 are shown as separate modules, in other implementations, these modules may be combined.

The voice controlled device 100 may also include operating system and a plurality of applications 112 stored in the computer-readable media 104 or otherwise accessible to the device 100. The operating system may be configured to manage hardware and services within and coupled to the device 100 for the benefit of other modules. In this implementation, the applications 112 are a music player 114, a movie player 116, a timer 118, and a personal shopper 120. However, the voice controlled device 100 may include any number or type of applications and is not limited to the specific examples shown here. The music player 114 may be configured to play songs or other audio files. The movie player 116 may be configured to play movies or other audio visual media. The timer 118 may be configured to provide the functions of a simple timing device and clock. The personal shopper 120 may be configured to assist a user in purchasing items from web-based merchants.

Datastores present may include a command and operating mode parameter database 122 and one or more user profiles 124 of users that have interacted with the device 100. The command and mode parameter database 122 may store data that is used in the recognition of wake words and/or commands in general by the wake word recognition module 106 and the speech recognition module 108. In some implementations, the parameters of the command and mode parameter database 122 may include recognition settings defined for various operating modes of the voice controlled device 100. Moreover, the parameters of the command and mode parameter database 122 may be retrieved by the parameter module 110 for the wake word recognition module 106 and the speech recognition module 108 to utilize in operation. The user profile(s) 124 may include user characteristics, preferences (e.g., user specific wake words), usage history, library information (e.g., music play lists), online purchase history, and other information specific to an individual user.

Generally, the voice controlled device 100 has input devices 126 and output devices 128. The input devices 126 may include a keyboard, keypad, mouse, touch screen, joystick, control buttons, etc. Specifically, one or more microphones 130 may function as input devices to receive audio input, such as user voice input. The output devices 128 may include a display, a light element (e.g., LED), a vibrator to create haptic sensations, or the like. Specifically, one a more speakers 132 may function as output devices to output audio sounds.

A user may interact with the device 100 by speaking to it, and the microphone 130 captures the user's speech. The device 100 can communicate back to the user by emitting audible statements through the speaker 132. In this manner, the user can interact with the voice controlled device 100 solely through speech, without use of a keyboard or display.

The voice controlled device 100 might further include a wireless unit 134 coupled to an antenna 136 to facilitate a wireless connection to a network. The wireless unit 134 may implement one or more of various wireless technologies, such as Wi-Fi, Bluetooth, RF, and so on. A USB 138 port may further be provided as part of the device 100 to facilitate a wired connection to a network, or a plug-in network device that communicates with other wireless networks. In addition to the USB port 138, or as an alternative thereto, other forms of wired connections may be employed, such as a broadband connection.

Accordingly, when implemented as the primarily-voice-operated device 100(1), there may be no input devices, such as navigation buttons, keypads, joysticks, keyboards, touch screens, and the like other than the microphone(s) 130. Further, there may be no output such as a display for text or graphical output. The speaker(s) 132 may be the main output device. In one implementation, the voice controlled device 100(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 100(1) may be implemented as an aesthetically appealing device with smooth and rounded surfaces, with one or more apertures for passage of sound waves. The device 100(1) may merely have a power cord and optionally a wired interface (e.g., broadband, USB, etc.). Once plugged in, the device may automatically self-configure, or with slight aid of the user, and be ready to use. As a result, the device 100(1) may be generally produced at a low cost. In other implementations, other I/O components may be added to this basic model, such as specialty buttons, a keypad, display, and the like.

Additional description of the operation of the voice controlled device is provided below following the discussion of the alternative implementation shown in FIG. 2.

Figure 2:
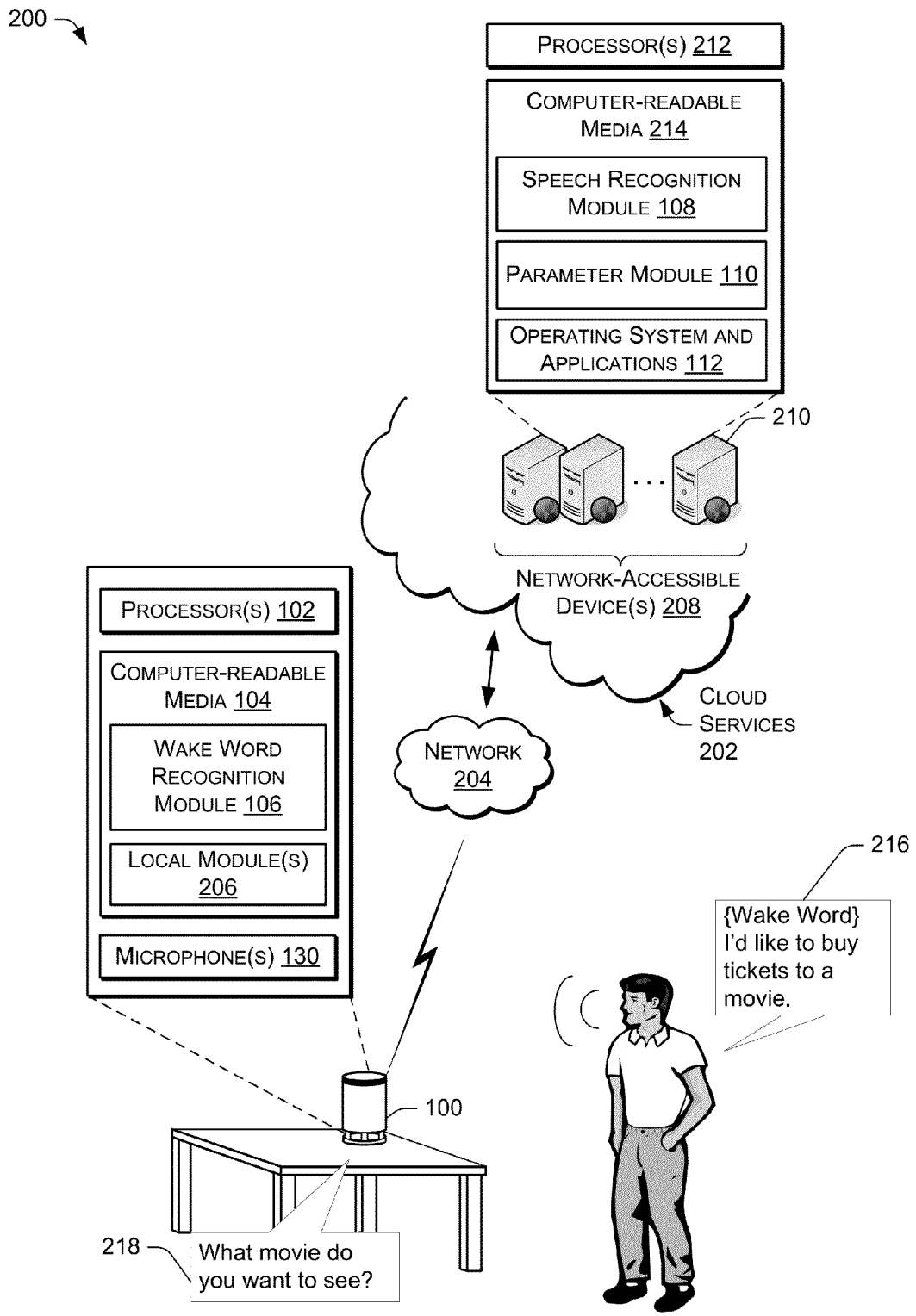
FIGS. 2-5 show a system in which selected components are implemented at remote cloud services accessible by the voice controlled device via a network data flow among those components and the voice controlled device.

FIG. 2 is an architecture 200 showing an alternative implementation of the device 100 in which some or all of the functional components of the device 100 may be provided by cloud services 202. The cloud services 202 generally refer to a network accessible platform implemented as a computing infrastructure of processors, storage, software, data access, and so forth that is maintained and accessible via a network 204 such as the Internet. Cloud services 202 may not require end-user knowledge of the physical location and configuration of the system that delivers the services. Common expressions associated with cloud services include "on-demand computing", "software as a service (SaaS)", "platform computing", "network accessible platform", and so forth.

In this implementation, the device 100 may be configured with the wake word recognition module 106, the parameter module 110 and one or more local modules 206 available in the computer-readable media 104 that provide instructions to the processor(s) 102. The local modules 206 may provide basic functionality such as creating a connection to the network 204 and initial processing of data received from the microphone 130 and controlling an output device such as a speaker. Other functionality associated with the device and system described in FIG. 1 may be provided by the remote cloud services 202.

The cloud services 202 include one or more network-accessible devices 208, such as servers 210. The servers 210 may include one or more processors 212 and computer-readable media 214. The processor(s) 212 and the computer-readable media 214 of the servers 210 are physically separate from the processor(s) 102 and computer-readable media 104 of the device 100, but may function jointly as part of a system that provides processing and memory in part on the device 100 and in part on the cloud services 202. These servers 210 may be arranged in any number of ways, such as server farms, stacks, and the like that are commonly used in data centers.

Furthermore, the speech recognition module 108, the parameter module 110 and/or any of the applications 112 shown in FIG. 1 may be located in the computer-readable media 214 of the cloud services 202. The specific location of the respective modules used to implement the features contained in this disclosure is not limiting and the discussions below are equally applicable to any implementation that includes a local device, a cloud-based service, or combinations thereof. In implementations in which the speech recognition module 108 is located in the computer-readable media 214 of the cloud services 202, the wake word recognition module 106 and the local modules 206 may further provide the functionality to recognize wake words and to forward voice input to the speech recognition module 108 in response to the recognition of a wake word.

The general operation of the system 200 may be as follows. The user may speak a phrase 216 including the wake word and a natural language command, "I'd like to buy tickets to a movie". The wake word recognition module 106 of the device 100 recognizes the wake word portion of phrase 216. The local module(s) 206 may then begin sending the audio input received at the microphone(s) 130 to the cloud services 202 for recognition of one or more natural language commands. Thus, the voice controlled device 100 is activated by the wake word and sends the phrase 216 to the cloud services 202. The servers 210 of the cloud services 202 process the natural language command portion of phrase 216, "I'd like to buy tickets to a movie." For example, the speech recognition module 108 of the servers 210 may recognize the received natural language command and send the appropriate response to the voice controlled device 100. As illustrated in FIG. 2, the device 100 receives and outputs the phrase 218, "What movie do you want to see?" The user may respond with the name of the movie and so on. Thus, the voice controlled device 100 may be operated while limiting the likelihood that the voice controlled device 100 will respond to background speech not intended as natural language commands.

Additional example operations of the system 200 are described with regard to FIGS. 3-5 below.

Figure 3:
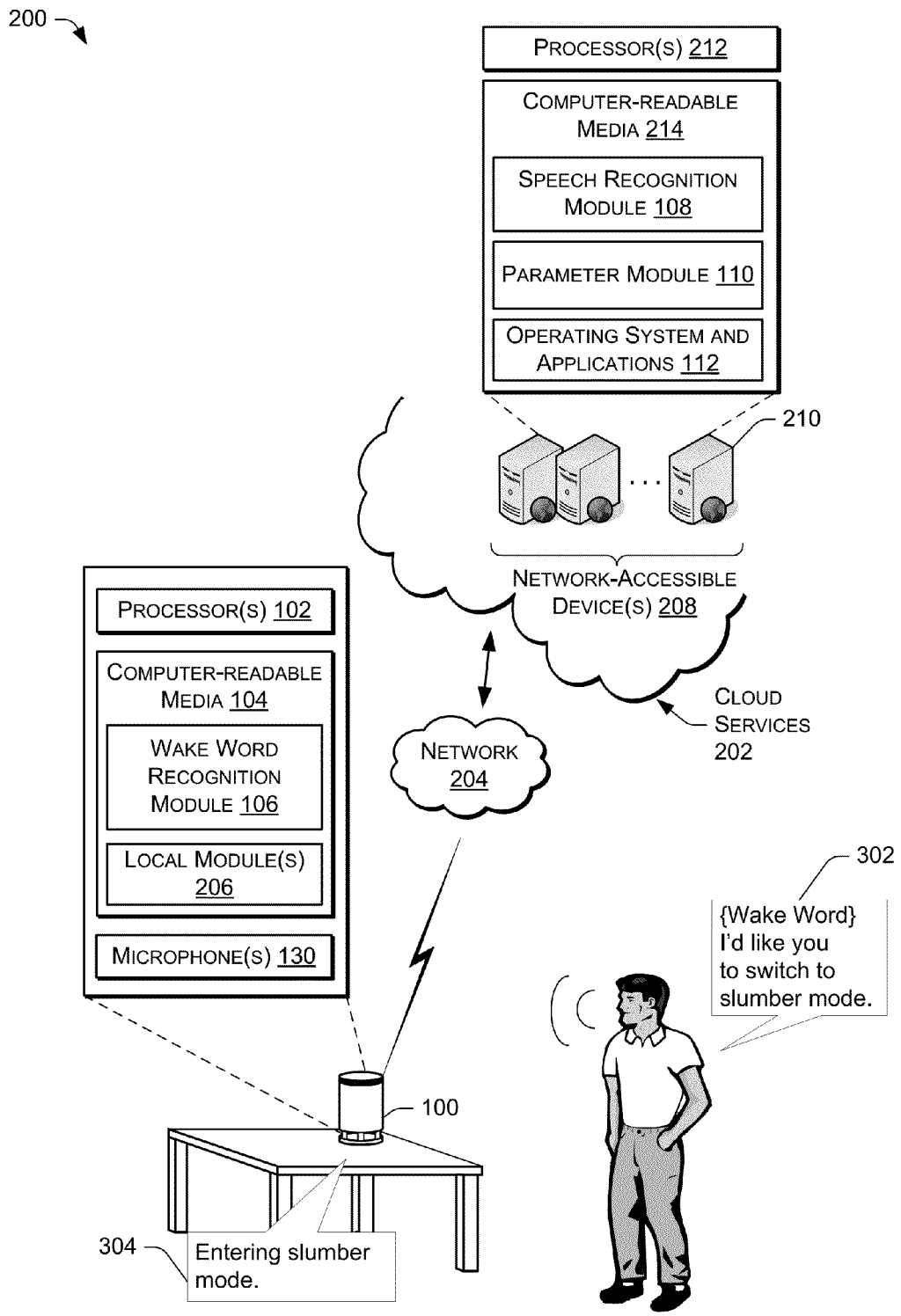

FIG. 3 illustrates the operation of the system 200 in which the user instructs the voice controlled device 100 to enter a slumber mode. In particular, during operation of the voice controlled device 100, the user may speak a phrase 302 including the wake word and the natural language command, "I'd like you to switch to slumber mode". The wake word recognition module 106 of the device 100 may recognize the wake word portion of phrase 302. The local module(s) 206 may then begin sending the audio input received at the microphone(s) 130 to the cloud services 202 for recognition of one or more natural language commands. Thus, the voice controlled device 100 sends the phrase 302 to the cloud services 202. The servers 210 of the cloud services 202 process the natural language command portion of phrase 302, "I'd like you to switch to slumber mode." For example, the speech recognition module 108 of the servers 210 may recognize the received natural language command. The parameter module 110 may query the command and mode parameter database to determine parameters for the operation of the voice controlled device 100 in slumber mode. In the case of the slumber mode, the parameters may include, for example, a higher complexity wake word, recognition settings including higher standards for recognition of the wake word and an exit slumber mode command, and so on. The servers 210 may then send the appropriate response to the voice controlled device 100 along with the parameters for operation of the voice controlled device 100 in slumber mode. Among other operating parameters, the slumber mode parameters may include parameters to continue performing one or more functions of the device 100 while in the slumber mode. For example, in the case of the device 100 streaming and playing music from a user's cloud stored music files, the entering of slumber mode may discontinue the upstreaming of audio from the microphones 130 to the cloud for command recognition but cause the downstreaming and playing of the music to continue. This may maintain the network connection but limit the device to server traffic which may in turn increase the privacy experienced by users.

As illustrated in FIG. 3, the device 100 receives and outputs the phrase 304, "Entering slumber mode." Thus, the voice controlled device 100 may enter the slumber mode which may have defined parameters for recognition and operation which may limit the likelihood that the voice controlled device 100 will respond to background speech not intended as natural language commands.

Figure 4:
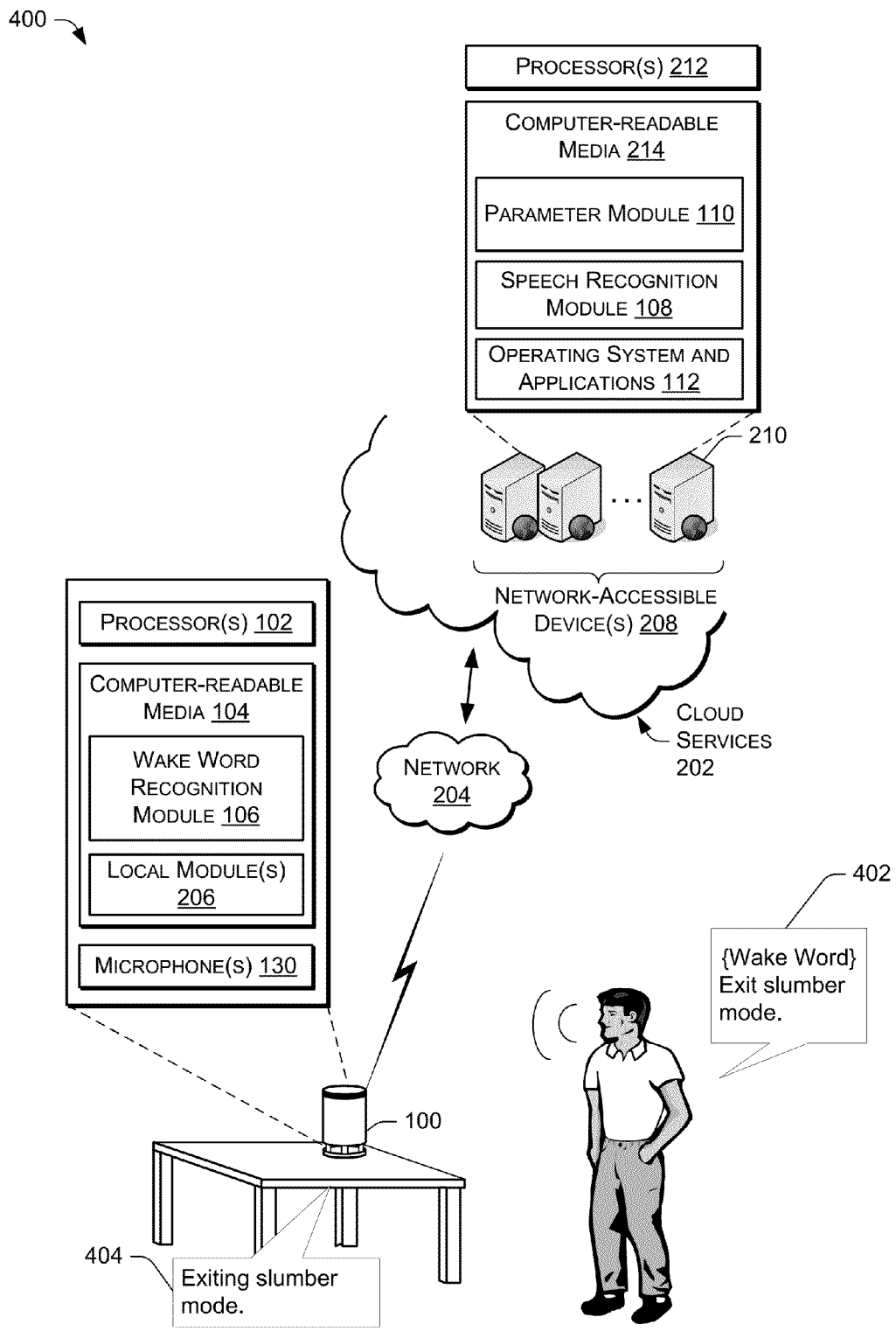

FIG. 4 illustrates the operation of the system 200 in which the user instructs the voice controlled device 100 to exit the slumber mode entered in FIG. 3. In particular, during operation of the voice controlled device 100 in slumber mode, the user may speak a phrase 402 including the wake word and a natural language command, "Exit slumber mode". The wake word recognition module 106 of the device 100 may recognize the wake word portion of phrase 402 based on the parameters of the slumber mode. The local module(s) 206 may then begin sending the audio input received at the microphone(s) 130 to the cloud services 202 for recognition of the one or more natural language commands. Thus, the voice controlled device 100 sends the phrase 402 to the cloud services 202. The servers 210 of the cloud services 202 process the natural language command portion of phrase 402, "Exit slumber mode." For example, as the natural language command portion of the phrase 402 does not specify a subsequent mode to enter, the speech recognition module 108 of the servers 210 may recognize the received natural language command as a command to exit slumber mode and enter a default operating mode. The parameter module 110 may query the command and mode parameter database to determine the parameters for the operation of the voice controlled device 100 in the default operating mode. The servers 210 may then send the appropriate response to the voice controlled device 100 along with the parameters for operation of the voice controlled device 100 in the default operating mode.

As illustrated in FIG. 4, the device 100 receives and outputs the phrase 404, "Exiting slumber mode." Thus, the voice controlled device 100 may enter the default operating mode with particular recognition settings which may have lower thresholds for recognition of the wake word and commands in comparison to the slumber mode.

As mentioned above, the techniques and systems disclosed herein may be applied to other functionality as well as to operating modes of the voice controlled device 100. For example, the recognition of different commands by the server may have different parameters. FIG. 5 illustrates such an example implementation.

Figure 5:
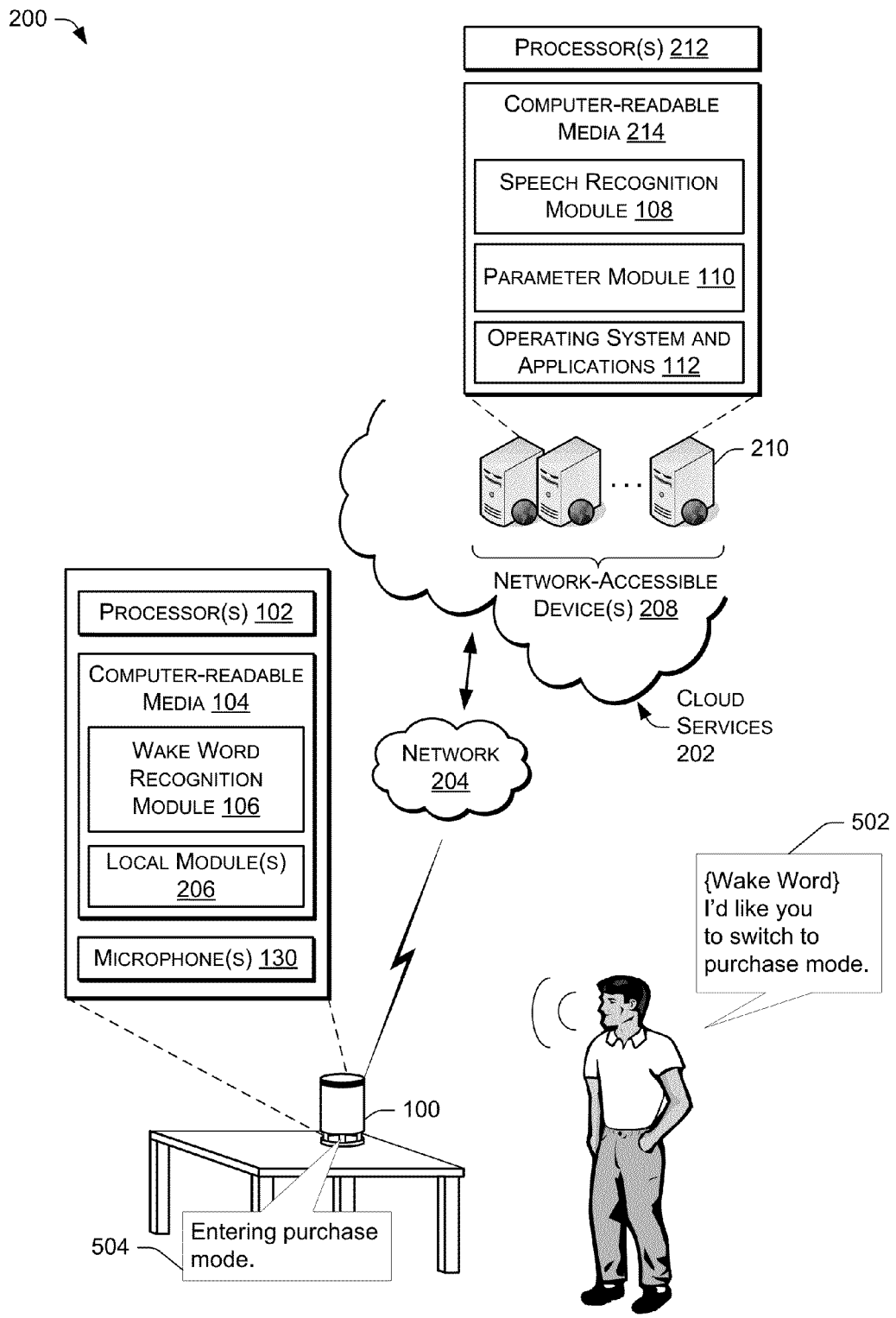

FIG. 5 illustrates the operation of the system 200 in which the user instructs the servers 210 to enable a purchase mode in which the system 200 allows for the purchase of content from the cloud services 202 via the voice controlled device 100. In particular, in some implementations, a primary or controlling user of the may wish to have the device not allow purchases except when placed in a "purchase mode." The enabling of purchase mode may have recognition parameters that include a higher than default recognition certainty, user restrictions and the like.

During operation of the voice controlled device 100, the user may speak a phrase 502 including the wake word and a natural language command, "I'd like you to switch to purchase mode." The wake word recognition module 106 of the device 100 may recognize the wake word portion of phrase 502 based on the parameters of the current operating mode. The local module(s) 206 may then begin sending the audio input received at the microphone(s) 130 to the cloud services 202 for recognition of the one or more natural language commands. Thus, the voice controlled device 100 sends the phrase 502 to the cloud services 202. The servers 210 of the cloud services 202 process the natural language command portion of phrase 502, "I'd like you to switch to purchase mode." For example, upon making a preliminary detection of the command to switch to purchase mode, the speech recognition module 108 of the servers 210 may query the parameter module 110 for the recognition parameters for entering purchase mode. The parameter module 110 may query the command and mode parameter database to determine recognition parameters for entering purchase mode and, if appropriate, the parameters for operation of the voice controlled device 100 in purchase mode. If the phrase 502 is determined to meet the recognition parameters defined for entering purchase mode, the servers 210 may enable the recognition of purchase commands for the user of the voice controlled device 100. The servers 210 may then send the appropriate response to the voice controlled device 100 and, if appropriate, the parameters for operation of the voice controlled device 100 in purchase mode. As illustrated in FIG. 5, the device 100 receives and outputs the phrase 504, "Entering purchase mode." Thus, the servers 210 may enter the purchase mode based on the particular recognition parameters.

Figure 6A:
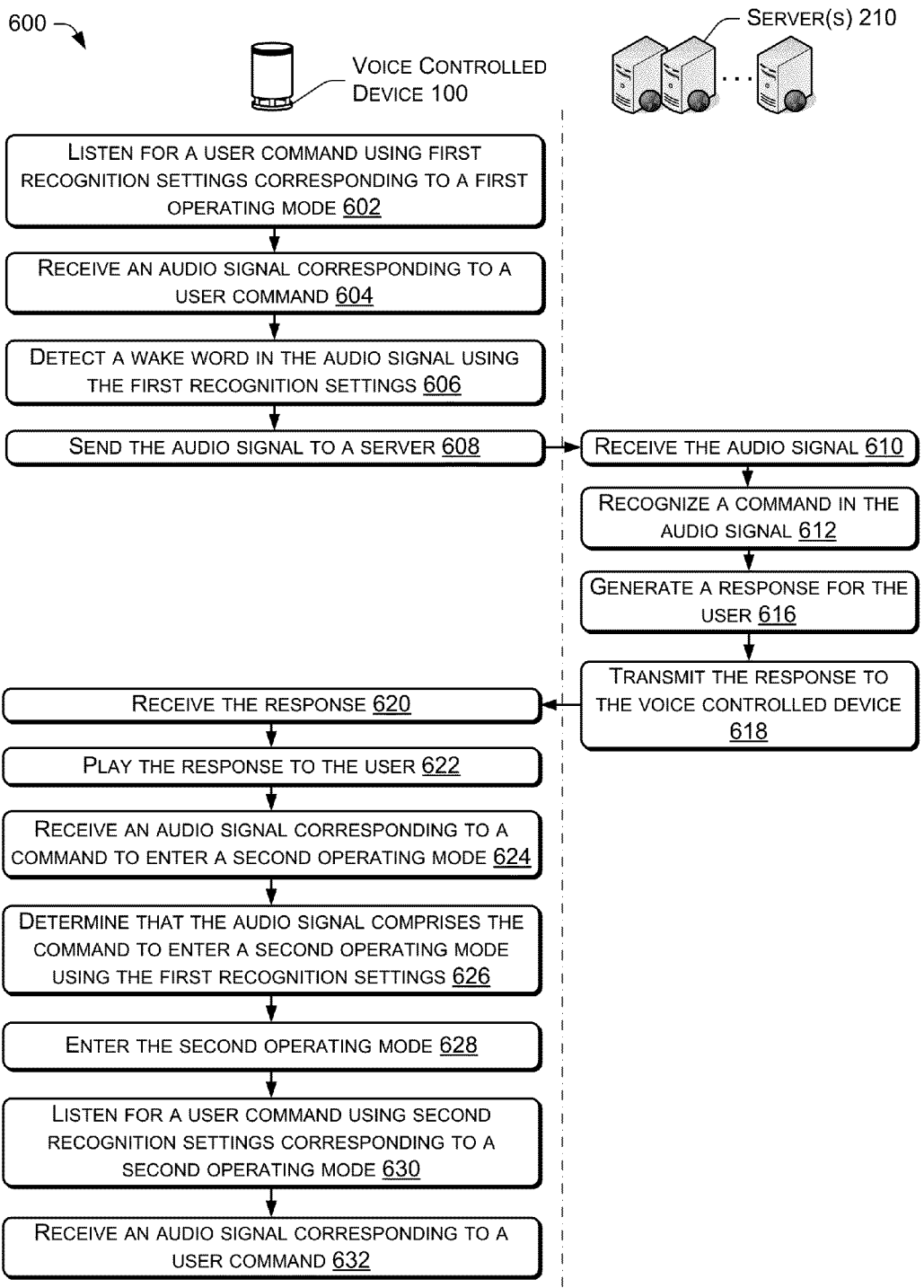
FIGS. 6A and 6B show a flow diagram of an illustrative process for the operation of the system of FIGS. 2-5.
Figure 6B:
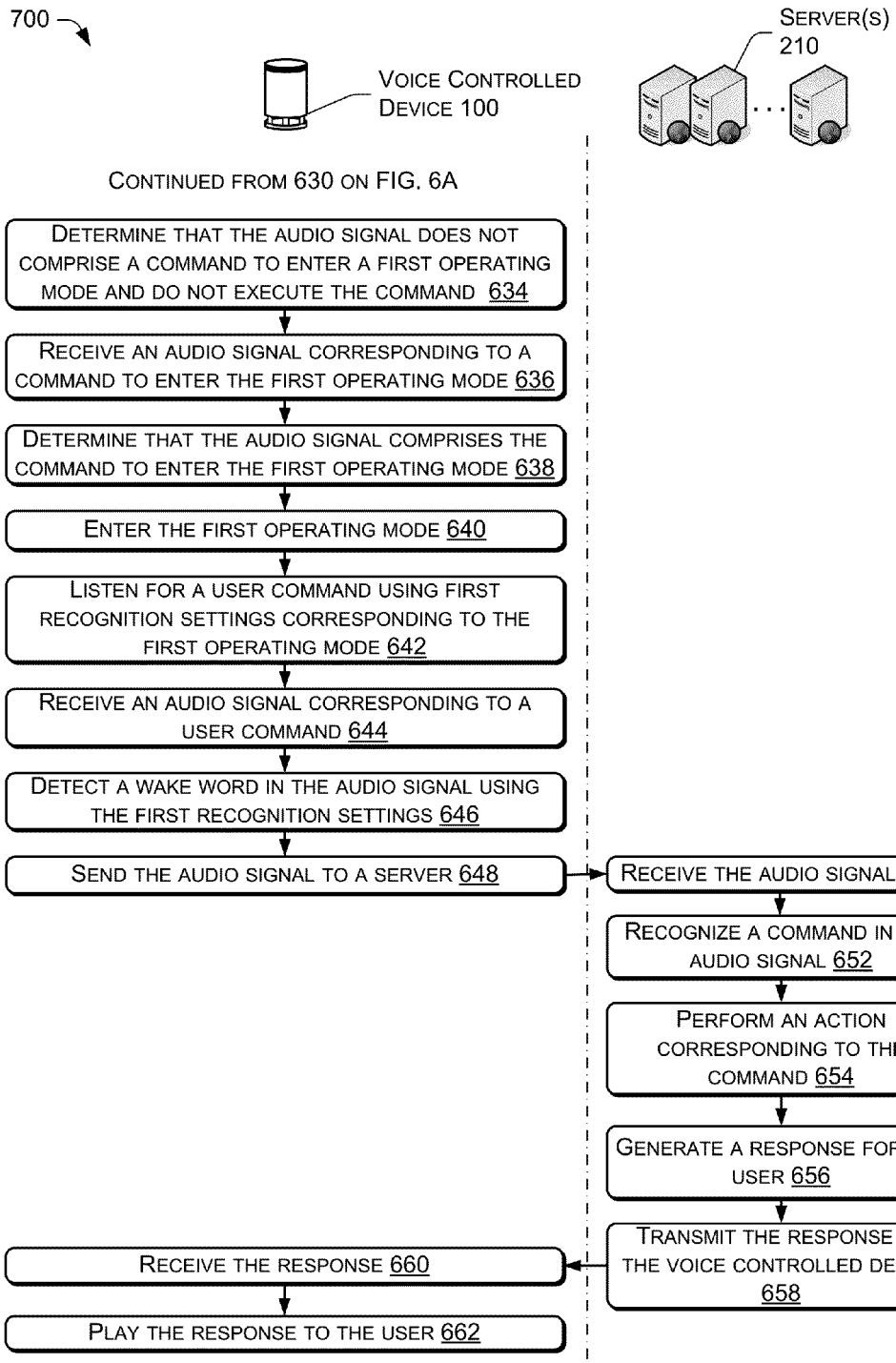

FIGS. 6A and 6B shows an example process 600 illustrating the use of wake words to activate a voice control functionality of a device and to alter the operating modes of the device and/or servers in communication with the device based on differential recognition parameters. The process 600 may be implemented by the voice controlled device 100 and server(s) 210 of FIG. 2, or by other devices. This process is illustrated as a collection of blocks or actions in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

For purposes of describing one example implementation, the blocks are arranged visually in FIGS. 6A and 6B in columns beneath the voice controlled device 100 and server(s) 210 to illustrate that these devices of the system 200 may perform these operations. That is, actions defined by blocks arranged beneath the voice controlled device 100 may be performed by the voice controlled device 100, and similarly, actions defined by blocks arranged beneath the server(s) 210 may be performed by one or more server(s) 210.

At 602, the voice controlled device 100 may listen for a user command using first recognition settings corresponding to a first operating mode. As discussed above, the recognition settings corresponding to the first operating mode may include wake word(s) and/or one or more recognition certainty levels for the first operating mode. At 604, the voice controlled device 100 may receive an audio signal corresponding to a user command. At 606, the voice controlled device 100 may detect a wake word of the first operating mode in the received audio signal using the first recognition settings. Based on the recognition, at 608, the voice controlled device 100 may send the audio signal to a server of the server(s) 210.

At 610, the server may receive the audio signal from the device 100. At 612, the server may operate to recognize a command in the audio signal. In some implementations, the recognition of the command by the server may also be based on recognition settings of the first operating mode. At 614, the server may perform an action corresponding to the command. At 616, the server may generate a response for the user. At 618, the server may transmit the response to the voice controlled device 100. At 620, the voice controlled device 100 may receive the response, and, at 622, play the response to the user.

At 624, the voice controlled device 100 may receive an audio signal corresponding to a command to enter a second operating mode. For example, the command to enter the second operating mode may include a wake word of the first operating mode and a natural language phrase to enter the second operating mode. In a more particular example in which the second operating mode is a slumber mode, the command may include the wake word of the first operating mode and the phrase, "enter slumber mode." At 626, the voice controlled device 100 may determine that the audio signal comprises the command to enter a second operating mode using the first recognition settings. As illustrated, the determination that the audio signal includes a command to change operating modes is performed by the voice controlled device 100. However, as discussed above, depending on the implementation, the command to change operating modes may be detected by the device 100, the servers 210, or by different entities depending on various factors (e.g. current operating mode, the mode to which the command indicates operation is to switch, etc.).

At 628, the voice controlled device 100 may enter the second operating mode. Entering the second operating mode may, among other things, include the voice controlled device 100 and/or servers 210 loading second recognition settings corresponding to the second operating mode. For example, the voice controlled device 100 may load recognition settings from a local or remote database.

At 630, the voice controlled device 100 may listen for a user command using the second recognition settings corresponding to the second operating mode. At 632, the voice controlled device 100 may receive an audio signal corresponding to a user command. At 636, the voice controlled device 100 may determine that the audio signal does not comprise a command to enter a first operating mode and not execute the command. In the example case of the second operating mode being a slumber mode, the commands that the system may respond to may be limited to a command to exit the slumber mode or to enter the first operating mode.

At 638, the voice controlled device 100 may receive an audio signal corresponding to a command to enter the first operating mode or to exit the second operating mode. Continuing the example of the slumber mode, the command include a wake word of the slumber mode and/or a natural language phrase instructing the voice controlled device 100 may to return to a default mode (or another first operating mode) or to exit the slumber mode (which may imply a first operating mode to enter). At 640, the voice controlled device 100 may determine that the audio signal comprises the command to enter the first operating mode and, at 642, enter the first operating mode. As with entering the second operating mode, entering the first operating mode may include loading recognition settings and other parameters of operation for the first operating mode.

At 644, the voice controlled device 100 may listen for a user command using the first recognition settings corresponding to the first operating mode. At 646, the voice controlled device 100 may receive an audio signal corresponding to a user command. At 648, the voice controlled device 100 may detect a wake word in the audio signal using the first recognition settings and, at 650, send the audio signal to a server of the servers 210.

At 652, the server of the servers 210 may receive the audio signal from the voice controlled device 100. At 654, the server may recognize a command in the audio signal. At 656, the server may perform an action corresponding to the command and, at 658, generate a response for the user. At 660, the server may transmit the response to the voice controlled device 100. At 652, the voice controlled device 100 may receive the response and, at 654, play the response to the user.

The techniques described above and illustrated in FIGS. 6A and 6B are merely examples and implementations are not limited to these techniques. Rather, other techniques for the operation of the device 100 and system 200 may be employed and the implementations of the system disclosed herein are not limited to any particular technique.

For example, in some implementations, the operating mode functionality, and particularly the slumber mode functionality, may include streaming to the cloud as soon as the initial wake word is received. For example, in implementations in which the user speaks a wake word and then the command "exit slumber mode" to the voice control device 100 while the voice controlled device 100 is in slumber mode, the wake word recognition module 108 of the voice controlled device 100 may operate to recognize the wake word using the recognition settings of the slumber mode, then stream the command "exit slumber mode" to the servers 210. If the command is included in the audio input data, the servers 210 may instruct the device 100 to exit the slumber mode and to load the parameters of a default or other operating mode. If the captured audio following the wake word does not include the command to exit slumber mode, the server may instruct the voice controlled device 100 to discontinue streaming until the next wake word recognition. As such, in some implementations, different operating mode changes may be implemented and/or may occur with different processing.

In some implementations, the techniques may be applied to specific commands, subsets of commands, or the like instead of the overall operation of the voice controlled device 100. For example, some implementations may include server side commands that may alter the recognition of specific commands or subsets of commands by the server(s). Some examples may include commands to lock, restrict, disable, unlock, unrestrict, and/or enable particular functionality, such as purchasing of content or other items, access to types of content, and so on.

These and many other variations on the disclosed systems and techniques would be apparent to one of ordinary skill in the art in view of this disclosure. Moreover, as mentioned above, the discussion herein presented example implementations in which the natural language commands were primarily audio or speech data. However, implementations are not so limited and the natural language input of such implementations may be of a type other than audio or may be a combination of various types of natural language input which may or may not include audio.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computing system comprising:
one or more hardware processors;
one or more computer-readable storage media storing computer-executable instructions maintained in the one or more computer-readable storage media and executed by the one or more hardware processors to cause the one or more hardware processors to perform acts comprising:
in a first operating mode:
receiving a first input audio signal corresponding to a first user utterance, wherein the first user utterance comprises a wake word and a first command;
determining that the first user utterance comprises the wake word;
transmitting at least a portion of the first input audio signal to a remote device, wherein the remote device causes a first action to be performed based at least in part on the first command;
receiving an output audio signal from the remote device, wherein the output audio signal corresponds to the first action;
playing the output audio signal;
receiving a second input audio signal corresponding to a second user utterance, wherein the second user utterance comprises a second command to enter a second operating mode;
determining that the second user utterance comprises the second command to enter the second operating mode;
entering the second operating mode, wherein entering the second operating mode includes at least one of maintaining a connection to the remote device or continuing to play the output audio signal;
in the second operating mode:
receiving a third input audio signal corresponding to a third user utterance, wherein the third user utterance comprises the wake word and a third command;
determining that the third command does not comprise a command to change to the first operating mode;
at least partly in response to determining that the third command does not comprise a command to change to the first operating mode, refraining from performing an action corresponding to the third command;
receiving a fourth input audio signal corresponding to a fourth user utterance, wherein the fourth user utterance comprises a fourth command to enter the first operating mode;
determining that the fourth user utterance comprises the fourth command to enter the first operating mode; and
entering the first operating mode, with the first operating mode and the second operating mode.

2. The system as recited in claim 1, wherein:
the determining that the first user utterance comprises the wake word is performed using first recognition settings corresponding to the first operating mode; and
the determining that the fourth user utterance comprises the fourth command to enter the first operating mode is performed using second recognition settings corresponding to the second operating mode.

3. The system as recited in claim 2, wherein the second recognition settings include a recognition certainty that is a higher level of certainty than a recognition certainty of the first recognition settings.

4. The system as recited in claim 2, wherein the computer-executable instructions maintained in the one or more computer-readable storage media are further executed by the one or more hardware processors to cause the one or more hardware processors to perform acts comprising:
in the first operating mode:
receiving a fifth input audio signal corresponding to a fifth user utterance, wherein the fifth user utterance comprises a wake word and a fifth command;
determining that the first user utterance comprises the wake word; and
transmitting at least a portion of the first input audio signal to the remote device, wherein the remote device causes a functionality of at least one of the system or the remote device to be one of locked, restricted, disabled, unlocked, unrestricted, or enabled.

5. A method comprising:
processing, by a voice controlled device comprising a hardware processor and a microphone, a first audio input signal generated by the microphone and corresponding to a first user utterance;
recognizing a wake word based on one or more recognition settings of a first operating mode, wherein the one or more recognition settings of the first operating mode differ from one or more recognition settings of a second operating mode of the voice controlled device;
in response to the recognizing of the wake word, causing further processing of the first audio input signal;
storing an indication that the voice-controlled device is operating in the second operating mode;
receiving a second input audio signal corresponding to a second user utterance;
determining that the second utterance does not comprise a command to change to the first operating mode; and
at least partly in response to determining that the second user utterance does not comprise a command to change to the first operating mode, refraining from performing an action corresponding to the second user utterance.

6. The method as recited in claim 5, wherein a recognition certainty level of the recognition settings of the first operating mode for recognition of audio input in the first operating mode is higher than a recognition certainty level of the recognition settings of the second operating mode.

7. The method as recited in claim 5, further comprising:
in the first operating mode:
transmitting at least a portion of the first audio input signal to a remote device, wherein the remote device causes an action to be performed based at least in part on a first command included in the portion of the first audio input signal;
receiving an output audio signal from the remote device, wherein the output audio signal corresponds to the action; and
playing the output audio signal.

8. The method as recited in claim 5, wherein the voice controlled device provides additional functionality in the first operating mode not provided in the second operating mode.

9. The method as recited in claim 8, wherein the additional functionality in the first operating mode includes initializing a connection to one or more remote devices and providing an audio input signal to the remote devices for recognition of commands in the provided audio input signal by the one or more remote devices.

10. The method as recited in claim 5, further comprising: in the second operating mode:
receiving a third input audio signal corresponding to a third user utterance, wherein the third user utterance comprises a command to enter the first operating mode;
determining that the third user utterance comprises a command to change to the first operating mode based on the one or more recognition settings of the second operating mode; and storing an indication that the voice-controlled device is operating in the first operating mode.

11. The method as recited in claim 5, wherein operating in the second operating mode includes maintaining a connection to a remote device.

12. A computing system comprising:
one or more hardware processors;
one or more computer-readable storage media storing computer-executable instructions maintained in the one or more computer-readable storage media and executed by the one or more hardware processors to cause the one or more hardware processors to perform the acts comprising:
receiving a first audio input signal corresponding to a first user utterance and comprising a wake word;
determining that the first user utterance comprises the wake word;
transmitting at least a portion of the first audio input signal to a remote device, wherein the remote device causes the computing system to perform a function of the computing system based at least in part on a first command in the portion of the first audio input signal;
receiving a second input audio signal corresponding to a second user utterance, wherein the second user utterance comprises a second command to enter a second operating mode;
determining that the second user utterance comprises the second command to enter the second operating mode;
storing an indication that the computing system is operating in the second operating mode, wherein operating in the second operating mode includes at least one of maintaining a connection to the remote device or not interrupting the function being performed by the computing system based at least in part on the first command;
receiving a third input audio signal corresponding to a third user utterance, wherein the third user utterance comprises the wake word and a third command;
determining that the third command does not comprise a command to change to the first operating mode; and
at least partly in response to determining that the third command does not comprise a command to change to the first operating mode, refraining from performing an action corresponding to the third command.

13. The computing system as recited in claim 12, wherein the function comprises:
receiving an output audio signal from the remote device, wherein the output audio signal corresponds to the function; and
playing the output audio signal, wherein the function is not interrupted such that the playing of the output audio signal continues after entering the second operating mode.

14. The computing system as recited in claim 13, wherein the determining that the first user utterance comprises the wake word is based on one or more recognition settings of a first operating mode.

15. The computing system as recited in claim 12, the computer-executable instructions maintained in the one or more computer-readable storage media further executed by the one or more hardware processors to cause the one or more hardware processors to perform acts comprising:
in the second operating mode:
receiving a fourth input audio signal corresponding to a fourth user utterance, wherein the fourth user utterance comprises a fourth command to enter the first operating mode;
determining that the fourth command comprises a command to change to the first operating mode; and
storing an indication that the computing system is operating in the first operating mode.

16. The computing system as recited in claim 15, wherein the determining that the first user utterance comprises the wake word is performed using first recognition settings corresponding to the first operating mode; and
the determining that the fourth command comprises a command to enter the first operating mode is performed using second recognition settings corresponding to the second operating mode.

* * * * *